United States Patent [19]
Dubois

[11] 4,038,441
[45] July 26, 1977

[54] METHOD OF MANUFACTURING A LIQUID CRYSTAL DEVICE WITH PLANE ALIGNMENT

[75] Inventor: Jean Claude Dubois, Paris, France

[73] Assignee: Thomson-CSF, Paris, France

[21] Appl. No.: 703,661

[22] Filed: July 8, 1976

Related U.S. Application Data

[63] Continuation of Ser. No. 535,975, Dec. 23, 1974, abandoned.

[30] Foreign Application Priority Data

Dec. 23, 1973 France .................. 73.46955

[51] Int. Cl.² .................. G02F 1/16; G02F 1/13
[52] U.S. Cl. .................. 427/109; 427/164; 427/165; 427/166; 427/167; 427/248 H; 427/255; 428/1; 350/160 LC
[58] Field of Search .............. 427/109, 164, 165, 167, 427/248, 407, 166, 255; 428/1; 350/160 LC

[56] References Cited

U.S. PATENT DOCUMENTS

| | | | |
|---|---|---|---|
| 3,532,539 | 10/1970 | Tokuyuma | 427/93 |
| 3,627,599 | 5/1972 | Goldmacher | 427/248 |
| 3,663,625 | 5/1972 | Lee | 427/248 |
| 3,700,489 | 10/1972 | Borysko | 427/248 |
| 3,728,008 | 4/1973 | Allan | 428/1 |
| 3,753,773 | 8/1973 | Lee | 427/248 |
| 3,809,456 | 5/1974 | Goldmacher | 350/160 LC |
| 3,816,113 | 6/1974 | Haas | 350/160 LC |
| 3,853,391 | 12/1974 | Jorkin | 428/1 |
| 3,854,793 | 12/1974 | Kahn | 428/1 |
| 3,989,354 | 11/1976 | Dubois | 428/1 |
| 3,994,567 | 11/1976 | Matsuo | 428/1 |

*Primary Examiner*—Michael F. Esposito
*Attorney, Agent, or Firm*—Cushman, Darby & Cushman

[57] ABSTRACT

A method of manufacturing devices in which a liquid crystal has molecules orientated in accordance with directions belonging to one and the same plane, is provided. To this end, an organic polymer deposit is formed upon the internal faces of two electrode-carrying plates, by directing on to them at a very low angle of incidence, a monomer vapor flow, for example a monomer such as vinyl-trichlorosilane. The long-chain molecules of the in situ formed polymer, are disposed parallel to the direction of the vapor flow. They orientate, by their influence, the molecules of the liquid crystal.

6 Claims, 2 Drawing Figures

METHOD OF MANUFACTURING A LIQUID CRYSTAL DEVICE WITH PLANE ALIGNMENT

This is a continuation, of application Ser. No. 535,975 filed Dec. 23, 1974 now abandoned The present invention relates to a method of manufacturing liquid crystal devices of "plane alignment" type, more particularly devices which utilise a nematic or smectic crystal with a helical structure.

Those skilled in the art will know that in the case of liquid crystals utilised for display purposes, a liquid crystal film is arranged between the flat and parallel surfaces of two transparent electrodes; if the liquid crystal is a nematic or smectic liquid crystal in the mesomorphous phase, then the elongated molecules of the liquid can be given orientations parallel to the planes of the electrodes if "plane alignment" is used. In the case of a helical structure, this being a special form of "plane alignment", the axes of the molecules remain perpendicular to a common direction, but, for an observer looking in this direction, appear to be regularly offset in a given direction. This structure confers upon the liquid crystal a rotating power which is readily observable if polarised light is used. This rotating power disappears if an electric field is applied to the structure, which field, in the case of liquid crystals exhibiting positive dielectric anisotropy, must be orientated in accordance with the common perpendicular to the axes of the molecules. This property is utilised for display applications.

The principle of the invention consists in forming an organic polymer at the surface of an electrode-carrying plate, by directing onto same, in an oven raised to the polymerisation temperature, a uniform "laminar" flow of monomer vapor, at a very low angle of incidence. A layer of long-chain molecules is formed, the molecules being orientated parallel to the direction of the flow.

According to the invention, there is provided a method of manufacturing of a liquid crystal device of plane alignment type, comprising the following steps:

the deposition upon two transparent substrates which exhibit two large faces, of a first layer of a transparent, electrically conductive substance;

the treatment of at least one of said substrates in a gas flow containing a vapour of an organic monomer and heated up to a predetermined temperature, said vapour circulating parallel to said large faces of the substrate in order to form a polymer deposit on said first layer, and thus constitute a second layer;

the insertion of a liquid crystalline substance in the mesomorphous phase, between the two substrates in such a fashion that said second layer is in contact with said crystalline substance.

The invention will be better understood and other of its features rendered apparent from a consideration of the ensuing description and the attached drawings in which.

Figure 1:
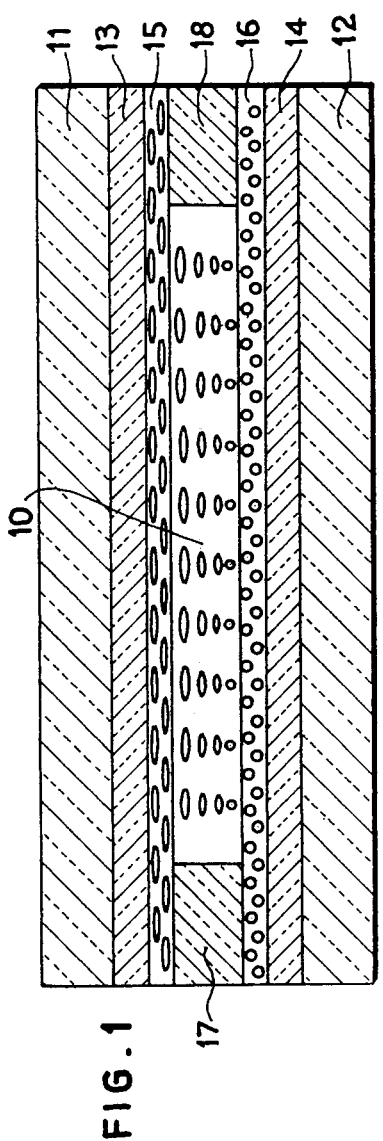
FIG. 1 illustrates a section through a liquid crystal device of "plane alignment" type.

The device shown in FIG. 1 comprises two glass plates 11 and 12 covered wholly or partially by electrodes 13 and 14 of stannic oxide (transparent, with good electrical conductivity). After treatment, the electrode-carrying plates comprise at the same sides as the electrodes, respectively a layer 15 and a layer 16 of organic polymer with long molecules orientated parallel to the large faces of the plates. After the introduction of a drop of liquid crystal 10 between the plates, one plate is rotated through 90° in relation to the other in order to give the liquid crystal molecules, previously orientated in a direction parallel to the polymer molecules, because of the influence of the latter, a helical structure of the kind shown symbolically in FIG. 1. Spacers 17 and 18 complete the device.

Figure 2:
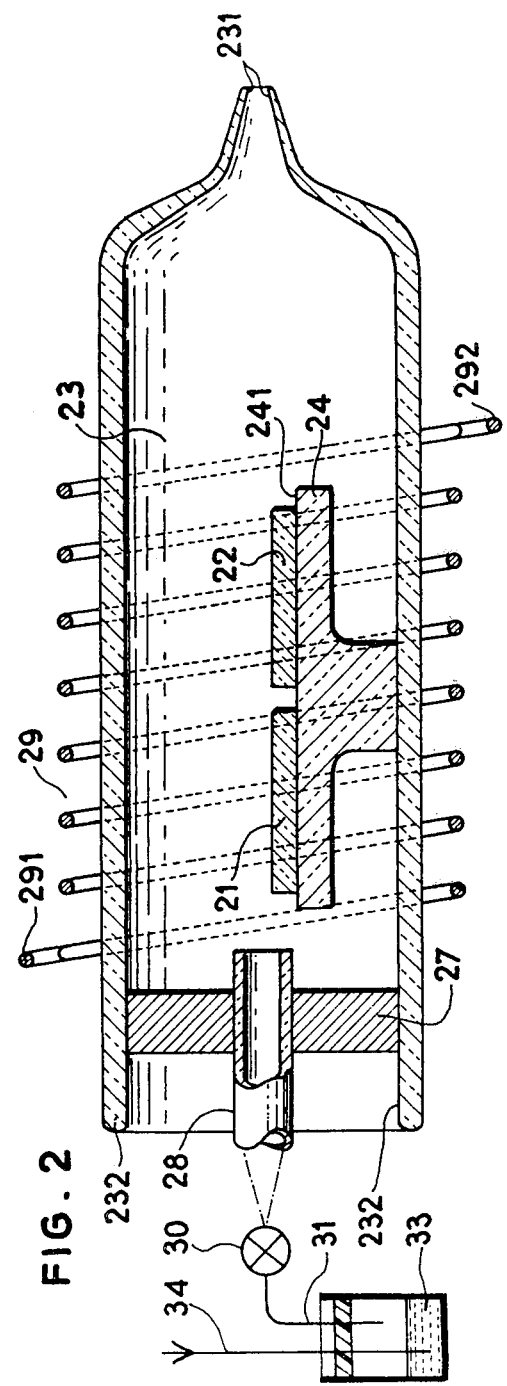
FIG. 2 illustrates fragmentarily, in section and on a large scale, and, partially, in the form of a smaller scale diagram, an apparatus for implementing the method of the invention.

FIG. 2 illustrates an example of an apparatus for processing the electrode-carrying plates by the method of the invention.

Two plates 21 and 22 are arranged in an enclosure 23 made of vitreous silica, the general shape of which is that of a cylinder with a horizontal axis. The enclosure comprises a mounting 24 of the same material arranged inside it, along a generatrix of the cylinder and having a horizontal surface 241 located at half the height of the internal space. The end of the tube 23 has a waisted form 231 and opens to the atmosphere. The end 232 of the enclosure is closed by a circular bulk head 27 through which there passes a glass tube designed to introduce vapour into the enclosure. This is surrounded, at its central portion, by a coil 29 constituted by a heater resistor whose ends 291 and 292 are connected to a variable-current generator which has not been shown.

The tube 28 is connected by a valve 30 to a piping arrangement 31 opening into a vessel 32 above the level of a liquid monomer 33. The monomer vapour is entrained by a flow of argon bubbling through the liquid and coming from a distribution system 34 supplying argon at constant pressure.

The operation of the apparatus is the following. The air in the enclosure 23 is progressively replaced by the monomer vapour. Heating is regulated and the flow likewise, in order to obtain upon a check sample arranged on the mounting 24, a satisfactory polymer deposit. The adjustment must be such that the vapour flow into the enclosure exhibits no turbulence whatsoever: the flow should be "laminar" and parallel to the surface 241. The treatment of the electrode-carrying plates is carried on for a time ranging from 10 to 30 minutes or more.

Self-evidently, the dimensions of the enclosure and those of its accessories, can be adapted in order to make it possible to simultaneously treat several plates at a time.

The monomers which can be used belong to quite diverse families of organic substances but have in common the property of polymerising from the vapour phase, in contact with a solid arranged in an oven. By way of example, reference can be made to methyl acrylate, methyl methacrylate, vinyl monomers, silanes, chlorosilanes and siloxanes.

Amongst these substances, the following derivatives which contain silicon, give excellent results:

dimethyl-dichlorosilane;
vinyl-trichlorosilane;
vinyl-triethosilane;
gamma-n-methyl-aminopropyl-triethoxysilane.

For example, when using vinyl-trichlorosilane, the optimum temperature is 240° C. For an apparatus of given dimensions, it has been found that at a flow rate of 50–100 $cm^3$ per minute, a deposit of around 100 angstroms units in thickness has formed in some ten minutes.

Polymer layers of arbitrary thickness (more than one micron) can be obtained, but generally speaking in order to create a liquid crystal device having good performance characteristics, the thickness will not exceed more than a few hundred angstroms units.

By way of a variant embodiment, it is possible to introduce into the enclosure a product designed to facilitate polymerisation, for example water vapour in the case of vinyl-trichlorosilane. The monomer introduced into the vessel 32 is then mixed with water.

What we claim is:

1. A method of manufacturing a liquid crystal device of plane alignment type, comprising the following steps:
   A. the deposition upon two transparent substrates which exhibit two large faces, of a first layer of transparent, electrically conductive substance;
   B. the treatment of at least one of said substrates in an enclosure made of vitreous silica, the general shape of which is that of a cylinder with a horizontal axis, said enclosure comprising a mounting arrangement along a generatrix of the cylinder, and having a horizontal surface accomodating said substrate, located at half the height of the internal space, said enclosure being surrounded at its central portion by a heater resistor; said treatment comprising the following operations:
   a. by means of a tube supplied with a vapor of a liquid monomer selected in the group of methyl acrylate, methyl methacrylate, vinyl monomers, silanes, chlorosilanes and siloxanes, progressively replacing the air of said enclosure by said vapor;
   b. adjusting the vapor flow in the enclosure for avoiding turbulence and regulating heating to a predetermined temperature for obtaining a polymer deposit onto said substrate;
   c. the insertion of a liquid crystalline substance in the mesomorphous phase, between the two substrates in such a fashion that said polymer deposit is in contact with said crystalline substance.

2. A method as claimed in claim 1, wherein said operation (b) is carried on during the time of 10 minutes and the thickness of said polymer deposit is of 100 angstroms.

3. A method as claimed in claim 1, wherein said organic monomer is dimethyl dichlorosilane.

4. A method as claimed in claim 1, wherein said organic monomer is vinyl-trichlorosilane, said predetermined temperature being 240° C.

5. A method as claimed in claim 1, wherein said organic monomer is vinyl-triethosilane.

6. A method as claimed in claim 1, wherein said organic monomer is gamma-n-methyl-aminopropyl-triethoxysilane.

* * * * *